(12) United States Patent
Da-Yuan et al.

(10) Patent No.: US 11,573,642 B2
(45) Date of Patent: Feb. 7, 2023

(54) WEARABLE DEVICES, METHODS AND MEDIA FOR MULTI-FINGER MID-AIR GESTURE RECOGNITION

(71) Applicants: Huang Da-Yuan, Markham (CA); Wei Li, Richmond Hill (CA)

(72) Inventors: Huang Da-Yuan, Markham (CA); Wei Li, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 17/138,677

(22) Filed: Dec. 30, 2020

(65) Prior Publication Data

US 2022/0206587 A1 Jun. 30, 2022

(51) Int. Cl.
*G06F 3/01* (2006.01)
(52) U.S. Cl.
CPC .............. *G06F 3/017* (2013.01); *G06F 3/014* (2013.01)
(58) Field of Classification Search
None
See application file for complete search history.

(56) References Cited

U.S. PATENT DOCUMENTS

| | | | | |
|---|---|---|---|---|
| 2011/0007035 A1* | 1/2011 | Shai | ...................... | G06F 3/0338 345/179 |
| 2014/0176439 A1* | 6/2014 | Keller | ..................... | G06F 3/014 345/159 |
| 2015/0062086 A1 | 3/2015 | Nattukallingal | | |
| 2017/0351345 A1* | 12/2017 | Nirjon | ..................... | G06F 3/014 |
| 2019/0094966 A1 | 3/2019 | Kulkarni et al. | | |
| 2020/0142497 A1 | 5/2020 | Zhu et al. | | |

FOREIGN PATENT DOCUMENTS

WO 2016003365 A1 1/2016

OTHER PUBLICATIONS https://us.geniusnet.com/supports/ring-mouse-2.
https://logbar.jp/en/.
https://www.litho.cc/.

(Continued)

*Primary Examiner* — Parul H Gupta

(57) ABSTRACT

Wearable devices, methods and processor-readable media for multi-finger mid-air gesture recognition are described. A smart ring wearable device having an array of proximity sensors located about the circumference of the ring is used, in conjunction with a motion sensor such as an accelerometer, to sense and recognize multi-finger mid-air gestures. The proximity sensors may be used to sense the relative positions and shapes of the fingers of the user's hand. The motion sensor may be used to detect gross movements of the finger, hand, and arm, and to detect other movements such as finger collisions using high-frequency sampling of accelerometer data to sense bio-acoustic vibrations. A gesture-sensing system may be operated by the wearable device, a gesture-controlled device, or another device to recognize the gestures based on the sensor data using a trained support-vector machine as a classifier.

20 Claims, 6 Drawing Sheets

(56) References Cited

OTHER PUBLICATIONS

Bogdan-Florin Gheran, Jean Vanderdonckt, and Radu-Daniel Vatavu. 2018. Gestures for Smart Rings: Empirical Results, Insights, and Design Implications. In Proceedings of the 2018 Designing Interactive Systems Conference (DIS '18). Association for Computing Machinery, New York, NY, USA, 623-635. DOI:https://doi.org/10.1145/3196709.3196741.

Liwei Chan, Yi-Ling Chen, Chi-Hao Hsieh, Rong-Hao Liang, and Bing-Yu Chen. 2015. CyclopsRing: Enabling Whole-Hand and Context-Aware Interactions Through a Fisheye Ring. In Proceedings of the 28th Annual ACM Symposium on User Interface Software & Technology (UIST '15). Association for Computing Machinery, New York, NY, USA, 549-556. DOI:https://doi.org/10.1145/2807442.2807450.

Gierad Laput, Robert Xiao, and Chris Harrison. 2016. ViBand: High-Fidelity Bio-Acoustic Sensing Using Commodity Smartwatch Accelerometers. In Proceedings of the 29th Annual Symposium on User Interface Software and Technology (UIST '16). Association for Computing Machinery, New York, NY, USA, 321-333. DOI:https://doi.org/10.1145/2984511.2984582.

https://www.gyration.com/.

\* cited by examiner

WEARABLE DEVICES, METHODS AND MEDIA FOR MULTI-FINGER MID-AIR GESTURE RECOGNITION

RELATED APPLICATION DATA

This is the first patent application related to this matter.

FIELD

The present application generally relates to methods and devices for controlling devices using hand gestures, and in particular to wearable devices, methods and processor-readable media for multi-finger mid-air gesture recognition.

BACKGROUND

Smart rings are a type of device, worn on a user's finger, enabling the user to provide user input to an electronic device such as a computer. Some smart rings may provide users with a relatively fast and eyes-free input mechanism. The ring form factor and size of a smart ring may make it socially inconspicuous and enable relatively private input, without observers necessarily recognizing the smart ring as a user input device. As a result, smart rings may be considered an attractive solution for controlling electronic devices used in a range of social settings, such as mobile electronic devices.

The input mechanisms used by commercially available smart rings usually involve button input, trackpad input, and/or motion input. For example, the Genius Ring Mouse 2, described at https://us.geniusnetcom/supports/ring-mouse-2, is a ring-shaped computer mouse using two buttons and one trackpad for input. The buttons are used as the left and right buttons of a mouse, and the trackpad is for moving the cursor position. Other smart rings use motion input to move the cursor position, typically by using a motion sensor. The motion sensor detects the ring's acceleration and orientation, which is used for inferring finger motions. For example, the Ring device marketed by Logbar Inc., described at https://logbar.ip/en/, and Litho Ring, a bar-shaped device worn on a user's finger and described at https://www.litho.cc/, include motion and touch sensors. Users can perform motion and touch gestures to control Internet of Things (IoT) devices in the physical world, or to control virtual objects in a virtual reality (VR) or augmented reality (AR) environment.

Commercially-available smart rings do not typically support multi-finger mid-air gestures. Multi-finger mid-air gestures allow users to control electronic devices using hand gestures performed in open air, as opposed to finger or hand movements performed in contact with a control surface such as a mouse, keyboard, touchscreen, or trackpad, and may thereby leverage the dexterity and full range of motion of human fingers. Multi-finger mid-air gestures have been widely used by many platforms, such as televisions, vehicle cockpits, and VR and AR devices. Research in human-computer interaction (HCI) suggests that users respond positively to devices supporting control through multi-finger mid-air gestures. For example, users may be able to control a device by performing intuitive hand gestures, which may reduce the learning curve for users to learn a set of gesture controls relative to current sets of smart ring gestures that do not leverage the flexibility of multi-finger gestures.

An experimental smart ring configured to sense multi-finger mid-air gestures, CyclopsRing, is described in Chan, Liwei & Chen, Yi-Ling & Hsieh, Chi-Hao & Liang, Rong-Hao & Chen, Bing-Yu. (2015). CyclopsRing: Enabling Whole-Hand and Context-Aware Interactions Through a Fisheye Ring. 10.1145/2807442.2807450, available at https://dl.acm.org/doi/10.1145/2807442.2807450. CyclopsRing uses a fisheye camera positioned between the wearer's index and middle fingers. The wide angle of view of the fisheye camera enables the device to capture multiple finger movements, enabling multi-finger mid-air gesture input. However, CyclopsRing has a number of limitations, which may prevent it from being successfully commercialized.

First, the CyclopsRing device does not have a conventional ring form factor. The fisheye camera occupies a relatively large space between two of the user's fingers, which may interfere with a user's other hand motions or activities and may make the device highly socially conspicuous. Second, finger-worn cameras raise privacy concerns for both the user of the device and any bystanders. This issue may also decrease the social acceptability of the device. Third, camera-based devices are power-consuming, reducing the battery life and therefore the use time of the device. Fourth, finger segments are very likely to block the fisheye lens in use. When performing multi-finger gestures, finger segments close to the lens occupy a large portion of the field of view, which decreases the reliability of gesture recognition.

There thus exists a need for a smart ring or other wearable device that overcomes one or more of the disadvantages of existing smart rings identified above.

SUMMARY

The present disclosure describes wearable devices, methods and processor-readable media for multi-finger mid-air gesture recognition. Embodiments described herein use a smart ring wearable device having an array of proximity sensors located about the circumference of the ring, in conjunction with a motion sensor such as an accelerometer, to sense and recognize multi-finger mid-air gestures. Thus, some embodiments described herein may provide a wearable device having a conventional ring form factor, which may present fewer privacy concerns than a camera-based gesture sensing system, may be more power-efficient than a camera-based smart ring, and which may mitigate the occlusion problem of existing approaches through the use of the array of proximity sensors. The proximity sensors may be used to sense the relative positions and shapes of the fingers of the user's hand. The motion sensor may be used to detect gross movements of the finger, hand, and arm, and to detect other movements such as finger collisions and rubbing movements using high-frequency sampling of accelerometer data to sense bio-acoustic vibrations.

As used herein, statements that a second item (e.g., a value, calculation, or determination) is "based on" a first item may mean that characteristics of the second item are affected or determined at least in part by characteristics of the first item. The first item may be considered an input to an operation or calculation, or a series of operations or calculations, that produces the second item as an output that is not independent from the first item.

In some aspects, the present disclosure describes a method for controlling a gesture-controlled device based on a mid-air gesture being performed by a user's hand. Sensor data is obtained from a wearable device worn on a primary finger of the user's hand. The sensor data comprises a plurality of proximity sensor data channels, each encoding proximity sensor data from a proximity sensor of the wearable device, and motion sensor data from a motion sensor of the wearable device. Control data is provided to the gesture-controlled device based on the sensor data.

In some examples, the method further comprises generating feature data based on the sensor data, the feature data indicating one or more features of the sensor data, and classifying the mid-air gesture to generate gesture classification data based on the feature data. The control data is based on the gesture classification data.

In some examples, the method further comprises, after receiving the sensor data and prior to generating the feature data, segmenting the sensor data to generate a plurality of motion sensor data frames, and, for each proximity sensor channel, a plurality of proximity sensor data frames. The plurality of motion sensor data frames is preprocessed by, for each motion sensor data frame, computing motion sensor power spectrum data by performing a Fourier transform on the motion sensor data frame, generating a plurality of average motion sensor data values based on the plurality of motion sensor power spectra, and preprocessing the plurality of proximity sensor data frames by generating, for each proximity sensor channel, a plurality of average proximity sensor data values based on the plurality of proximity sensor data frames of the proximity sensor channel, wherein the feature data is generated based on the plurality of average motion sensor data values, and the plurality of average proximity sensor data values of each proximity sensor channel.

In some examples, the feature data comprises one or more statistical features of the plurality of average motion sensor data values, and for each proximity sensor channel, one or more statistical features of the plurality of average proximity sensor data values, each statistical feature being selected from the list consisting of a mean, a minimum, a maximum, a median, a standard deviation, a range, and a number of peaks.

In some examples, classifying the gesture comprises fusing the feature data to generate a feature vector, and using a classifier to generate the gesture classification data based on the feature vector.

In some examples, the classifier comprises a trained support-vector machine (SVM).

In some examples, the method further comprises, prior to receiving the sensor data, training a support-vector machine using supervised learning to generate the trained support-vector machine.

In some examples, the motion sensor data comprises three channels of accelerometer data, each channel indicating acceleration of the wearable device with respect to a respective spatial axis, and three channels of gyroscope data, each channel indicating an angular velocity of the wearable device with respect to a respective spatial axis.

In some examples, the gesture classification data comprises probability data for each of a plurality of gesture classes, and the plurality of gesture classes includes at least one gesture class defined at least in part by relative positions of a thumb, index finger, and middle finger of a hand.

In some aspects, the present disclosure describes a wearable device configured to be worn on a primary finger of a hand. The wearable device comprises a motion sensor configured to generate a motion sensor signal indicating a motion of the wearable device, and a plurality of proximity sensors. Each proximity sensor is arranged at one of a plurality of circumferential locations of the wearable device defined by a circumference of the primary finger. Each proximity sensor faces in a proximity sensor direction outward from the primary finger. Each proximity sensor is configured to generate a proximity sensor signal indicating a proximity of an object to the proximity sensor in the proximity sensor direction.

In some examples, the wearable device further comprises a communication link configured to transmit motion sensor data based on the motion sensor signal and a plurality of channels of proximity sensor data. Each channel is based on a respective proximity sensor signal.

In some examples, the wearable device comprises a ring configured to be worn on the primary finger, the primary finger being an index finger.

In some examples, the plurality of circumferential locations comprise at least one location on a middle finger-facing portion of the ring, and at least one location on a thumb-facing portion of the ring.

In some examples, each proximity sensor comprises a sensor selected from the list consisting of an infrared light sensor, an ultrasonic sensor, and a radar sensor.

In some examples, the motion sensor comprises an accelerometer, and the motion sensor signal comprises three channels of accelerometer data, each channel indicating acceleration of the wearable device with respect to a respective spatial axis.

In some examples, the motion sensor further comprises a gyroscope, and the motion sensor data further comprises three channels of gyroscope data, each channel indicating an angular velocity of the wearable device with respect to a respective spatial axis.

In some examples, the motion sensor comprises an accelerometer, and the motion sensor data comprises accelerometer data sampled at a frequency greater than 100 Hz.

In some examples, the motion sensor comprises an accelerometer, and the motion sensor data comprises accelerometer data sampled at a frequency greater than 3000 Hz.

In some examples, the wearable device further comprises a multiplexer configured to generate a multiplexed proximity sensor signal based on the plurality of proximity sensor signals. The wearable device further comprises at least one signal amplifier configured to generate an amplified motion sensor signal based on the motion sensor signal, and generate an amplified multiplexed proximity sensor signal based on the multiplexed proximity sensor signal. The wearable device further comprises a controller configured to generate the motion sensor data based on the amplified motion sensor signal, and generate the plurality of channels of proximity sensor data based on the amplified multiplexed proximity sensor signal.

In some examples, the wearable device further comprises a controller configured to generate feature data based on the motion sensor signals and proximity sensor signals, the feature data indicating one or more features of the motion sensor signal and proximity sensor signals, and classify a mid-air gesture being performed by the hand to generate gesture classification data based on the feature data. The wearable device further comprises a communication link configured to transmit the gesture classification data.

In some aspects, the present disclosure describes a non-transitory processor-readable medium having machine-executable instructions stored thereon which, when executed by a processor device, cause the processor device to control a gesture-controlled device based on a mid-air gesture being performed by a user's hand. Sensor data is obtained from a wearable device worn on a primary finger of the user's hand. The sensor data comprises a plurality of proximity sensor data channels, each encoding proximity sensor data from a proximity sensor of the wearable device, and motion sensor data from a motion sensor of the wearable device. Control data is provided to the gesture-controlled device based on the sensor data.

In some aspects, the present disclosure describes a non-transitory processor-readable medium having instructions tangibly stored thereon. The instructions, when executed by a processor device, cause the processor device to perform the method steps described above.

Embodiments described herein may exhibit a number of advantages over existing approaches. The use of a motion sensor and an array of proximity sensors allows the sensing and recognition of multi-finger mid-air gestures. In some embodiments, the wearable device used to sense multi-finger mid-air gestures has a conventional smart ring form factor. The motion sensor is situated within or on the ring, and the proximity sensors are arranged around the circumference of the ring. The use of a conventionally-shaped ring form factor for the wearable device may make the device less socially conspicuous and may allow a user to provide input to an electronic device without attracting attention. In some embodiments, the smart ring may be the same size as a conventional ring worn as jewelry. In some embodiments, both the motion sensor and the proximity sensors sense only finger motions, thereby minimizing privacy concerns of users and bystanders associated with camera-based input devices. Compared to camera-based input devices, the power consumption of proximity sensors may be much lower; in some cases, the proximity sensor array may consume as little power as an light-emitting diode (LED) array. Finally, because the proximity sensor array is ring-shaped, with individual proximity sensors located at different locations around the circumference of the ring, the sensing range of the proximity sensor array may be nearly omnidirectional. Even if a part of the proximity sensor array is blocked by a finger segment, the remaining proximity sensors can still be used to detect other fingers' movements. This may mitigate the occlusion problem encountered with existing camera-based approaches.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes wearable devices, methods and processor-readable media for multi-finger mid-air gesture recognition. Embodiments described herein use a wearable device, such as a smart ring worn on a user's finger, to collect sensor data. The wearable device has an array of proximity sensors located about the circumference of the user's finger, in conjunction with a motion sensor such as an accelerometer, to sense and recognize multi-finger mid-air gestures. The proximity sensors may be used to sense the relative positions and shapes of the fingers of the user's hand. The motion sensor may be used to detect gross movements of the finger, hand, and arm, and to detect other movements such as finger collisions and rubbing movements using high-frequency sampling of accelerometer data to sense bio-acoustic vibrations.

Example embodiments will be described with reference to the figures, with the description broken down into multiple sections addressing different types of embodiments. An Example Wearable Devices section describes example wearable devices, such as smart rings, used to obtain sensor data. An Example Gesture-Controlled Devices section describes example electronic devices that can be controlled by gestures performed by a user, sensed by the wearable device, and recognized by a gesture-sensing system. The Example Gestures section describes example multi-finger mid-air gestures that can be classified into gesture classes by a gesture-sensing system to generate control data to control a gesture-controlled device. The Example Gesture-Sensing Systems section describes example gesture-sensing systems that may be used to classify multi-finger mid-air gestures sensed by the wearable device and, in response, generate control data for controlling the gesture-controlled device. The Example Methods for Controlling a Gesture-Controlled Device section describes example methods for performing the functions of the gesture-sensing system. In some examples, the steps of the described methods may be performed by the wearable device, by the gesture-controlled device, by another electronic device, or by some combination thereof.

Example Wearable Devices

A wearable device may be used to collect sensor data relating to multi-finger mid-air gestures being performed by a user's hand. The wearable device may be worn on a finger of the user's hand; the finger on which the wearable device is worn is referred to herein as the "primary finger", whereas the other fingers of the hand wearing the wearable device may be referred to as "secondary fingers" or "other fingers". The thumb is considered to be a finger for the purposes of this disclosure. The terms "hand" and "user's hand" as used herein refer to the hand on which the wearable device is worn.

Figure 1:
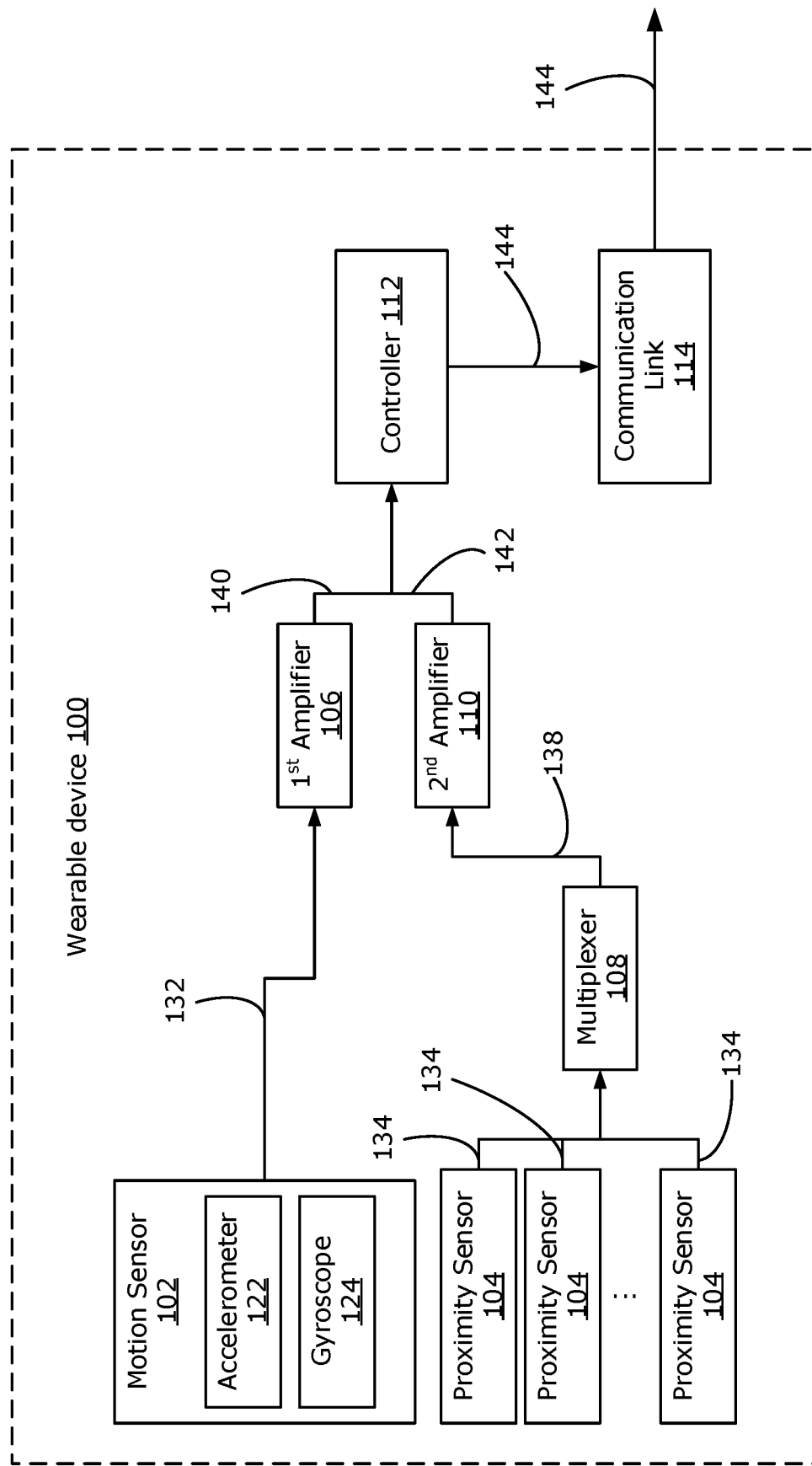
FIG. 1 is a block diagram of a wearable device for sensing multi-finger mid-air gestures, according to examples described herein.

FIG. 1 shows a block diagram of an example wearable device 100 for sensing multi-finger mid-air gestures. The various functional blocks, signals, and data shown in FIG. 1 are described in this section.

In some embodiments, the wearable device takes the form of a smart ring. In some embodiments, the smart ring is intended to be worn on a user's index finger.

Figure 2A:
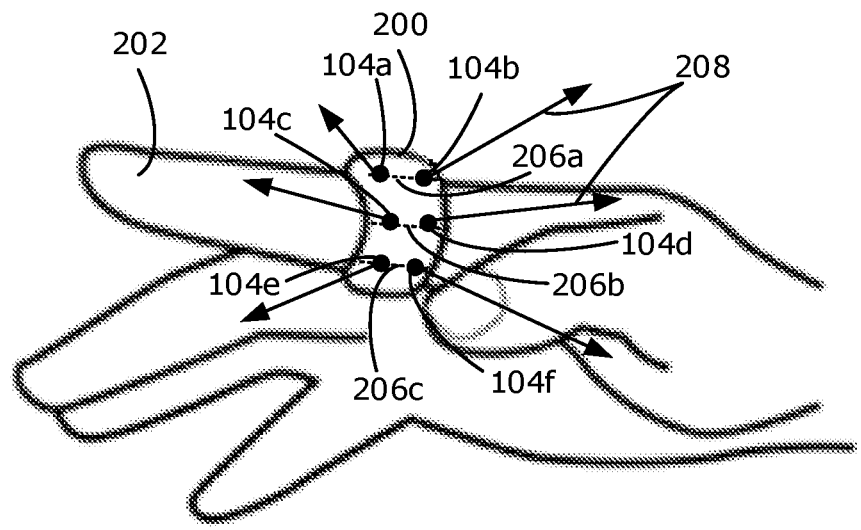
FIG. 2A is a side view of a user's hand wearing an example wearable device, shown as a smart ring, in the index finger, according to examples described herein.
Figure 2B:
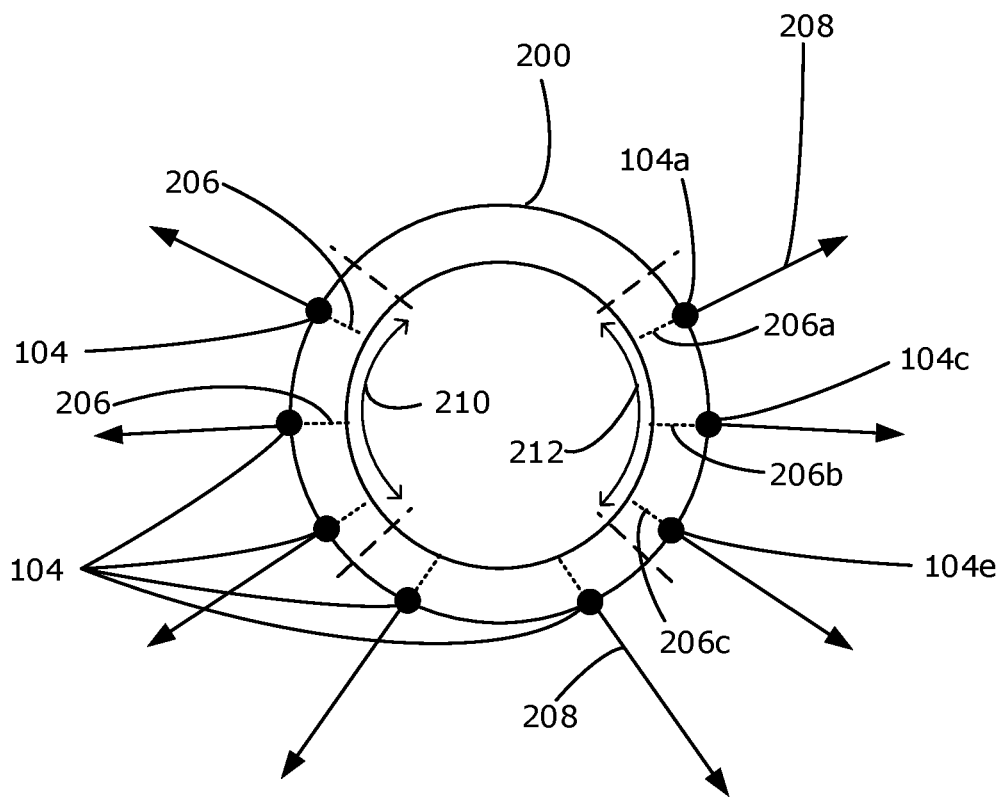
FIG. 2B is a front view of the smart ring of FIG. 2A showing the locations and sensor directions of a plurality of proximity sensors of the smart ring.

FIGS. 2A-2B show an example embodiment of the wearable device 100 as a smart ring 200 worn on an index finger as the primary finger. The smart ring 200 includes an array of proximity sensors 104, 104a-f, described in greater detail below.

The wearable device 100 (such as smart ring 200) may include a motion sensor 102 configured to generate a motion sensor signal 132 indicating a motion of the wearable device 100. In some embodiments, the motion sensor 102 includes an accelerometer 122 configured to generate three channels of accelerometer data as part of the motion sensor signal. Each channel of accelerometer data indicates the acceleration of the wearable device with respect to a respective spatial axis (e.g., three dimensions of movement, x-y-z). In some embodiments, the motion sensor further comprises a gyroscope 124 configured to generate three channels of gyroscope data as part of the motion sensor signal. Each channel of gyroscope data indicates an angular velocity of the wearable device 100 with respect to a respective spatial axis (e.g., angular velocity about axes x-y-z). It will be appreciated that the three axes of acceleration measured by the accelerometer 122 need not be the same as the axes of rotation measured by the gyroscope 124.

In some embodiments, the accelerometer 122 is sampled at a frequency of at least 100 Hz in order to generate accelerometer data as part of the motion sensor data that can be used to detect bio-acoustic vibrations indicating gesture-related events such as collisions of fingers of the user's hand with other fingers, other parts of the user's hand, or other objects. Examples of finger collision events will be described in the Example Gestures section. In some embodiments, the sampling rate of the accelerometer is greater than 3000 Hz. Using a very high frequency sampling rate (such as 4000 Hz) may enable detection of higher-frequency bio-acoustic vibrations caused by events such as rubbing movements of the user's hand against other objects. Typically, a sampling rate of at least double the frequency of the bio-acoustic vibration will allow for encoding of the bio-acoustic vibration without exhibiting aliasing.

Detection of bio-acoustic vibrations using an accelerometer sampled at high frequencies (approximately 4000 Hz) has been demonstrated and described in Gierad Laput, Robert Xiao, and Chris Harrison. 2016. ViBand: High-Fidelity Bio-Acoustic Sensing Using Commodity Smartwatch Accelerometers. In Proceedings of the 29th Annual Symposium on User Interface Software and Technology (UIST '16). Association for Computing Machinery, New York, N.Y., USA, 321-333. DOI:https://doi.org/10.1145/2984511.2984582 (hereinafter "ViBand"), which is hereby incorporated by reference in its entirety. Whereas the accelerometer used in the ViBand reference was sampled at 4000 Hz, many gesture-related finger collision events localized at the hand wearing the wearable device 100 may potentially be detected using a lower sampling rate, such as 100 Hz.

In some embodiments, the motion sensor 102 may comprise an internal measurement unit (IMU) having an accelerometer 122 and a gyroscope 124, such as an ICM-20948 (described at https://invensense.tdk.com/products/motion-tracking/9-axis/).

In some examples, the accelerometer 122 may be used to detect the finger actions of the primary finger (e.g., the index finger), as well as the bio-acoustic vibration signals from the primary finger and/or one or more secondary fingers (e.g., the thumb). The gyroscope 124 may be used to determine the orientation of the wearable device 100 (i.e., yaw, roll, and pitch angles).

The wearable device 100 also includes a plurality of proximity sensors 104. The proximity sensors 104 may be arranged in an array about the circumference of the primary finger, such that each proximity sensor is arranged at one of a plurality of circumferential locations of the wearable device defined by a circumference of the primary finger. Individual proximity sensors 104 are shown in FIG. 2A as proximity sensors 104a and 104b at a first circumferential location 206a, proximity sensors 104c and 104d at a second circumferential location 206b, and proximity sensors 104e and 104f at a third circumferential location 206c on a thumb-facing side 212 of smart ring 200. Each circumferential location 206a-c includes two proximity sensors 104 in the example of FIG. 2A.

FIG. 2B shows a front view of the smart ring 200, showing the front-most of each pair of proximity sensor 104, 104a, 104c, 104e at each circumferential location 206, 206a-c. The front view shows a middle finger-facing side 210 of the smart ring 200 in addition to the thumb-facing side 212. In some embodiments, the plurality of circumferential locations 206 include at least one location 206 on the middle finger-facing portion 210 of the ring 200 and at least one location 206 on a thumb-facing portion 212 of the ring. It will be appreciated that, in embodiments intended to be worn on a primary finger other than the index finger, the middle finger-facing portion 210 and thumb-facing portion 212 may be renamed accordingly. Whereas the middle finger-facing portion 210 and thumb-facing portion 212 are shown in FIG. 2B as each occupying approximately 25% of the circumference of the ring 200, it will be appreciated that in some embodiments these portions 210, 212 may occupy more or less of the circumference of the ring 200.

As shown in FIGS. 2A-2B, each proximity sensor 104a-f faces in a proximity sensor direction 208 outward from the primary finger 202. Each proximity sensor 104 is configured to generate a proximity sensor signal 134 indicating a proximity of an object to the proximity sensor 206a-f in the proximity sensor direction 208. The proximity sensor directions 208 are shown in FIG. 2A oriented radially outward from the primary finger 202. The proximity sensor directions 208 of the back-most proximity sensors 104b, 104d, 104f are angled slightly backward toward the base of the primary finger 202, and the proximity sensor directions 208 of the front-most proximity sensors 104a, 104c, 104e are angled slightly forward toward the tip of the primary finger 202.

In some embodiments, each proximity sensor 104 may include an infrared light sensor, an ultrasonic sensor, and/or a radar sensor. In other embodiments, the proximity sensors 104 may include other sensors capable of detecting absolute or relative motion of the primary finger and its two neighboring fingers (e.g., the thumb, index finger, and middle finger for wearable devices worn on the index finger). In some embodiments, the proximity sensors 104 may be 2-dimensional (2D) sensors configured to detect a 2-dimensional array of object proximity values over a 2D sensory field centered on the proximity sensor direction 208. In other embodiments, each proximity sensor 104 is a 1-dimensional (1D) sensor acting as a rangefinder along the proximity sensor direction 208. In still other embodiments, the proximity sensors 104, either individually or jointly, may be configured to detect a 3-dimensional array of object proximity values, e.g. using ultrasound, electromagnetic radiation with spectral values capable of penetrating human tissue, or other sensing modalities.

An example proximity sensor 104 may be an active sensor that operates by emitting a beam of energy (e.g., ultrasonic vibrations, infrared light, radar waves, or other sonic or electromagnetic energy) in the proximity sensor direction 208 and detecting the characteristics of the energy reflected back from a nearby object, thereby allowing the proximity sensor 104 to determine a distance of the object along the proximity sensor direction 208. A different example proximity sensor 206 may be a passive sensor detecting infrared or other energy emitted from a nearby object such as a finger.

In some embodiments, the proximity sensors 104 may include the VL6180X product (described at https://www.st.com/en/imaging-and-photonics-solutions/vl6180x.html), which includes an infrared light emitter, a range sensor, and an ambient light sensor. In other embodiments, the proximity sensors may include the CHI101 ultrasound sensor product (described at https://invensense.tdk.com/products/ch101/).

Returning to FIG. 1, the wearable device 100 in some embodiments may further include a multiplexer 108 configured to generate a multiplexed proximity sensor signal 138 based on the plurality of proximity sensor signals 134. The multiplexer 108 may effectively expand the number of the ports of the controller 112, described below. In some embodiments, the multiplexer 108 may include the M74HC151 product (described at https://www.st.com/en/switches-and-multiplexers/m74hc151.html) or the TCA9548A product (described at https://www.ti.com/product/TCA9548A).

In some embodiments, the wearable device 100 may further include at least one signal amplifier (shown as two amplifiers 106, 110) configured to generate an amplified motion sensor signal 140 based on the motion sensor signal 132, and generate an amplified multiplexed proximity sensor signal 142 based on the multiplexed proximity sensor signal 138. In the example of FIG. 1, a first amplifier 106 generates the amplified motion sensor signal 140, and a second amplifier 110 generates the amplified multiplexed proximity sensor signal 142. In some embodiments, the amplifier(s) are signal amplifiers that increases the resolution of sensor signals, which may assist the gesture-sensing system 310 (described in the Example Gesture-Sensing Systems section below) to extract more signal features for use in gesture recognition, such as the ADS1115 16-bit gain amplifier product (described at https://www.adafruit.com/product/1085) or the PAM8302 product (described at https://www.adafruit.com/product/2130).

The wearable device 100 may further include a controller 112 configured to generate sensor data 144. The sensor data includes motion sensor data based on the amplified motion sensor signal 140 and a plurality of channels of proximity sensor data based on the amplified multiplexed proximity sensor signal 142. Each channel of proximity sensor data in the sensor data may be based on a respective proximity sensor signal 134. The sensor data may be digital data is compressed or otherwise preprocessed prior to transmission over a communication link.

The wearable device 100 may further include a communication link 114 configured to transmit the sensor data 144. The communication link 114 may be a wired or wireless communication link configured to communicate with a network (e.g., an intranet, the Internet, a P2P network, a WAN and/or a LAN) or other electronic device. The communication link 114 may include wired links (e.g., Ethernet cable) and/or wireless links (e.g., one or more antennas) for intra-network and/or inter-network communications. In some embodiments, the communication link 114 is a Bluetooth™ wireless communication module, including a Bluetooth™ antenna.

In some embodiments, the controller 112 and communication link 114 may be combined in a single unit, such as a micro control unit with wireless communication capabilities. In some embodiments, the combined micro control unit may include the STM32WB50CG device (described at https://www.st.com/content/st_com/en/products/microcontrollers-microprocessors/stm32-32-bit-arm-cortex-mcus/stm32-wireless-mcus/stm32wb-series/stm32wbx0-value-line/stm32wb50cg.html) or the Beetle BLE product (described at https://www.dfrobot.com/product-1259.html).

In some embodiments, one or more steps of the method 600 for controlling a gesture-controlled device based on a mid-air gestures, described in the Example Methods for Controlling a Gesture-Controlled Device section below, may be performed by the controller 112. For example, in some embodiments some or all of the data segmentation step 604 and/or the preprocessing step 606 may be performed by the controller 112 before the segmented and/or preprocessed sensor data is transmitted by the communication link 114.

In use, the smart ring 200 may be worn on a primary finger, such as the index finger, of the user's hand. The primary finger is typically a predetermined finger, as the gesture-sensing system 310 is typically trained by a wearable device 100 worn on a predetermined primary finger, as described in the Example Gesture-Sensing Systems section below. When a user wears the smart ring on the index finger, the motion sensor 102 can be used for detecting index finger motions and collision events between different fingers. Since the smart ring is worn on the index finger, the actions of thumb and index fingers may also be detected by the motion sensor 102 using bio-acoustic sensing. The proximity sensors 104 sense the relative spatial information between thumb and index finger segments, allowing the smart ring to infer the spatial relationships between the three fingers. This makes the smart ring 200 capable of recognizing gestures composited by the thumb, index, and middle fingers.

The motion sensor 102 may detect not only motion of the primary finger and bio-acoustic vibrations, but also gross movements of the user's hand, arm, and body. The proximity sensors may be used not only to detect the locations of finger segments relative to the smart ring 200, but may also be used in some embodiments to detect the proximity of non-finger objects. All data gathered by the sensors of the wearable device 100 are available to the gesture-sensing system 310 described in the Example Gesture-Sensing Systems section below, and may potentially be used in recognizing gestures.

Example Gesture-Controlled Devices

Figure 3:
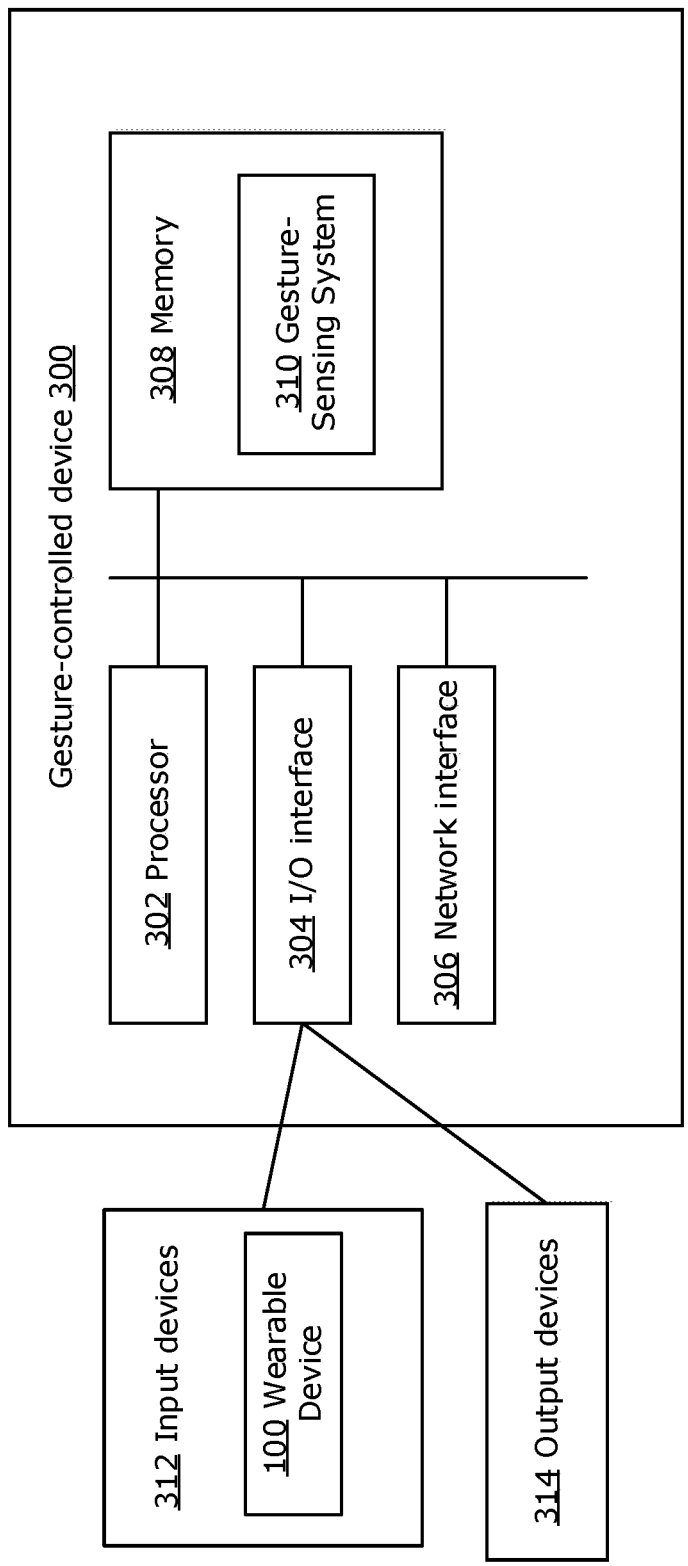
FIG. 3 is a block diagram of a gesture-controlled device configured to recognize multi-finger mid-air gestures based on sensor data from a wearable device, according to examples described herein.

FIG. 3 shows a block diagram of an example gesture-controlled device 300. Although an example embodiment of the gesture-controlled device 300 is shown and discussed below, other embodiments may be used to implement examples disclosed herein, which may include components different from those shown. Although FIG. 3 shows a single instance of each component of the gesture-controlled device 300, there may be multiple instances of each component shown.

The gesture-controlled device 300 shown in FIG. 3 is also used to perform the functions of the gesture-sensing system 310 described in the Example Gesture-Sensing Systems section below, which performs the method 600 for controlling a gesture-controlled device based on a mid-air gestures, described in the Example Methods for Controlling a Gesture-Controlled Device section below. However, in some embodiments one or more steps of the method 600 may be performed by the controller 112 of the wearable device 100 and/or by a separate device in communication with the wearable device 100 and the gesture-controlled device 300.

The gesture-controlled device 300 includes one or more processors 302, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 302 may collectively be referred to as a "processor device". The gesture-controlled device 300 also includes one or more input/output (I/O) interfaces 304, which interfaces input devices 312 such as cameras, microphones, keyboard, or computer mice, and output devices 314 such as a display or speaker. In some embodiments, the communication link 114 of the wearable device 100 communicates with the gesture-controlled device 300 via an input interface 304, and the wearable device 100 may be considered an input device 312.

The gesture-controlled device 300 may include one or more optional network interfaces 306 for wired or wireless communication with a network (e.g., an intranet, the Internet, a P2P network, a WAN and/or a LAN) or other node. The network interface(s) 306 may include wired links (e.g., Ethernet cable) and/or wireless links (e.g., one or more antennas) for intra-network and/or inter-network communications. In some embodiments, the communication link 114 of the wearable device 100 communicates with the gesture-controlled device 300 via a network interface 306, such as a wireless network interface (e.g., 802.11 or Belutooth™). In some examples, a Bluetooth™ interface of the gesture-controlled device 300 may be used to communicate with the communication link 114 of the wearable device 100 and may be considered either a network interface 306 or an input interface 304.

The gesture-controlled device 300 includes one or more memories 308, which may include a volatile or non-volatile memory (e.g., a flash memory, a random access memory (RAM), and/or a read-only memory (ROM)). The non-transitory memory(ies) 308 may store instructions for execution by the processor(s) 302, such as to carry out examples described in the present disclosure. The memory(ies) 308 may include other software instructions, such as for implementing an operating system and other applications/functions.

In some examples, the gesture-controlled device 300 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 300) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 300 may communicate with each other via a bus, for example.

In some embodiments, a distributed system may include multiple gesture-controlled devices 300 as well as optionally one or more additional components. The distributed system may include multiple gesture-controlled devices 300 in communication with each other over a network; for example, an electronic device may communicate over a network with a remote server or cloud computing platform which performs the methods described herein and provides the output of those methods to the gesture-controlled devices 300. Thus, gesture recognition may be carried out through some combination of local processing (i.e. at the gesture controlled device 300) and remote or central processing (i.e. at a central server).

Example Gestures

To help in understanding the present disclosure, a discussion of gestures is first provided. In the present disclosure, a hand gesture is generally defined as a distinct hand shape that may be recognized by the gesture-controlled device 100 as a particular command. A hand gesture may have different shapes and movement. For example, hand gestures may be recognized by the gesture-controlled device 300 as belonging to one of the gesture classes shown in FIG. 4.

Figure 4:
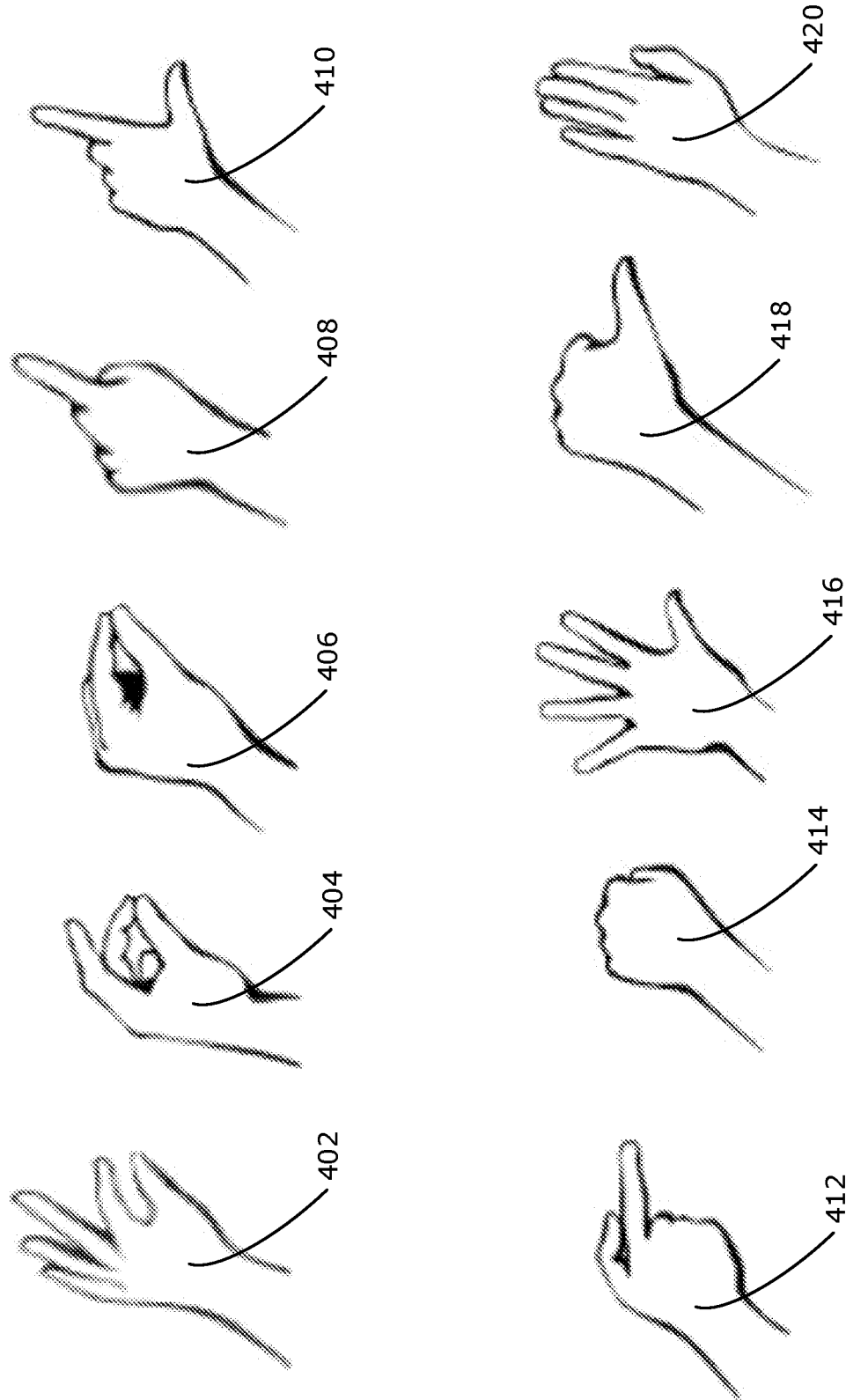
FIG. 4 illustrates ten example multi-finger mid-air gestures that may be recognized by an example gesture-sensing system.

FIG. 4 illustrates ten gestures, each of which is typical of a gesture class into which gestures may be classified by the gesture-sensing system 310 described below in the Example Gesture-Sensing Systems section. Other gesture classes not shown in FIG. 4 may also be recognized by the gesture-sensing system 310.

The gestures shown in FIG. 4 are: a pinch-open gesture 402, in which the index finger and thumb are held close together but not touching; a middle-finger pinch-closed gesture 404, in which the tips of the middle finger and thumb touch each other; an index-finger pinch-closed gesture 406, in which the tips of the index finger and thumb touch each other; a pointing gesture 408, in which the thumb and middle finger are closed together against the palm and the index finger points outward; an L-shape gesture 410, in which the index finger and thumb are extended to form an approximately 90 degree angle; a gun-shape gesture 412, in which the thumb lies flat against the side of the hand, the index finger is extended, and the other fingers are curled against the palm; a first gesture 414, in which all fingers are curled inward with the thumb on top; a splayed hand gesture 416, in which all fingers are extended outward and away from each other; a thumb-out gesture in which the thumb is extended outward and all other fingers are curled inward toward the palm; and an open hand gesture 420 in which the fingers are all extended and held close together to form a flat surface.

The gestures shown in FIG. 4 all typify or illustrate their respective gesture classes—thus, for example, the first gesture 414 would likely be classified by an example gesture-sensing system 310 as an instance of a first gesture class. In some examples described herein, the term "gesture" may be used to mean either an instance of a gesture class or the gesture class itself, as will be appreciated from context.

Each of the gestures shown in FIG. 4, and other gestures defined by a static configuration of a user's and and/or fingers, may be referred to herein as a "static gesture" falling within a "static gesture class". In some examples, a static gesture is recognized as falling within a static gesture class when it is held in a generally fixed location (e.g., within a defined area that allows for some margin of error) for at least a defined period of time (e.g., 1 second). In some examples described herein, reference may be made to "dynamic gestures" falling within "dynamic gesture classes". A dynamic gesture may be recognized as falling within a dynamic gesture class when it exhibits a combination of one or more static gesture classes, locations, and/or movements. Some dynamic gestures may involve both combinations of static gesture classes as well as changes in location of the hand, or a first static gesture in one location followed by a second static gesture in another location. For example, a dynamic gesture class may be defined as a single static gesture class that changes in location over time (e.g., based on motion sensor data 132). An "L-shape" static gesture 410 that changes in location (e.g., because the hand moves from left to right as indicated by the motion sensor data 132) may be recognized by the gesture-sensing system 310 as falling within a particular dynamic gesture class.

Different embodiments of the gesture-sensing system 310 may be configured or trained to classify dynamic gestures into any number of different dynamic gesture classes. Dynamic gestures that may be recognized by an example embodiment as falling within a dynamic gesture class include a mouse-click dynamic gesture, in which the index finger is used to click an imaginary mid-air mouse button (e.g., the "left mouse button" when performed by the right hand); a middle-finger mouse-click dynamic gesture, in which the middle finger is used to click an imaginary mid-air mouse button (e.g., the "right mouse button" when performed by the right hand); a two-finger pinch dynamic gesture, in which the index finger and thumb move from a pinch-open gesture 402 to an index-finger pinch-closed gesture 406; a three-finger pinch dynamic gesture, in which the index finger, middle finger, and thumb move from a first static gesture in which the index and middle fingers are held close to but not touching the thumb, to a second static gesture in which the tips of the index and middle fingers are brought into contact with the tip of the thumb; a gunshot dynamic gesture, in which a variant of the gun-shape gesture 412 is performed with the thumb extending away from the hand and then coming into contact with the side of the hand to perform the standard gun-shape gesture 412; a zoom-out dynamic gesture in which the fingers move from a first position in which the index finger and middle finger are close to the thumb, to a second position in which the index finger and middle finger are farther away from the thumb; a zoom-in dynamic gesture in which the fingers move from a first position in which the index finger and middle finger are far away from the thumb, to a second position in which the index finger and middle finger are closer to the thumb (i.e., similar to a three-finger pinching dynamic gesture); a first dynamic gesture in which the thumb, index finger, and middle finger move from a first extended position to a second closed position; and a pointing dynamic gesture in which the hand performs a pointing static gesture 408 and then moves the hand such that tip of the index finger indicates a particular point in space. Example dynamic gesture classes corresponding to the dynamic gestures described above are provided merely as examples, and may vary in different embodiments. Furthermore, it will be appreciated that all of the example dynamic gestures described above are defined by movements of the first three fingers (thumb, index, middle) of a hand, and may therefore be readily detected by a wearable device 100 configured to be worn on the index finger and therefore detect detailed movements of the index finger and its two neighboring fingers. In embodiments using a wearable device 100 configured to be worn on a different finger, other dynamic gesture classes involving other fingers may be defined by the gesture-sensing system 310.

Example Gesture Sensing Systems

Figure 5:
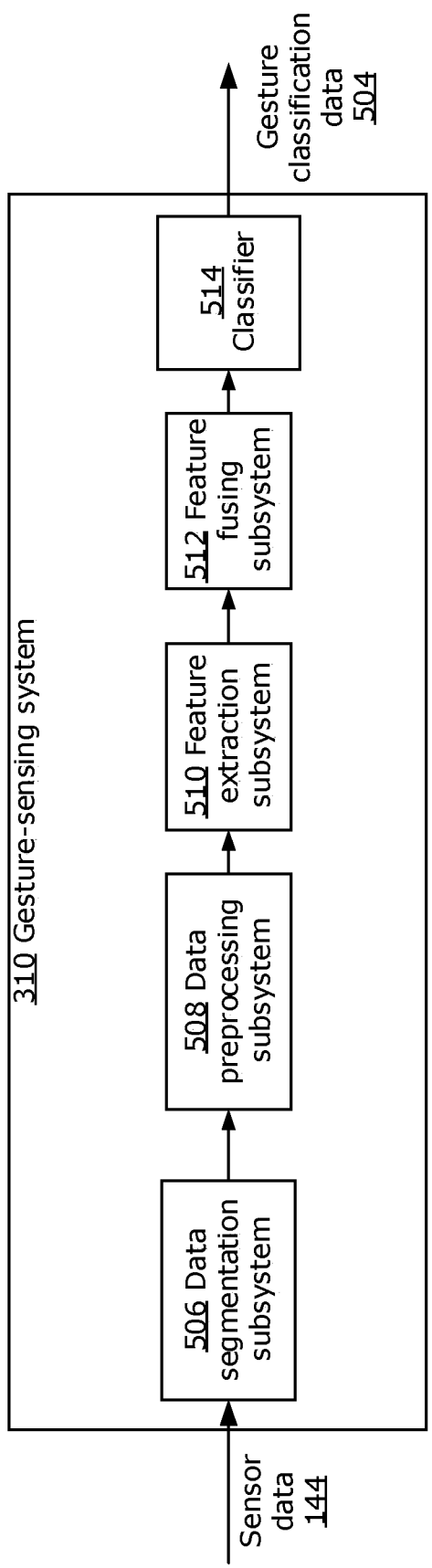
FIG. 5 is a block diagram of an example gesture-sensing system that may be operated by a gesture-controlled device, wearable device, or other device, according to examples described herein.

FIG. 5 is a block diagram illustrating an example gesture-sensing system 310. In some embodiments, the gesture-sensing system 310 may be implemented by the processor device 302 of the gesture-controlled device 300 when it executes instructions stored in the memory 308. In other embodiments, the gesture-sensing system 310 may be implemented by a remote server or cloud computing platform in communication with the gesture-controlled device 300 via the network interface 306. In some embodiments the wearable device 100 (e.g., using the controller 112) may implement the gesture-sensing system 310. Thus, in various embodiments the different functions of the gesture-sensing system 310 may be performed by the wearable device 100, the gesture-controlled device 300, another electronic device(s), or some combination thereof.

The gesture-sensing system 310 receives sensor data 144 from the wearable device 100. In embodiments performing one or more functions of the gesture-sensing system 310 using the wearable device 100 itself, such as the controller 112, the sensor data 144 may be understood to be received from the controller 112 before the functions of the gesture-sensing system 310 are performed on the sensor data 144, e.g., potentially by the controller 112 itself. This use by the controller 112 of sensor data 144 generated by the controller 112 may also be referred to herein as the sensor data 144 being received "from the wearable device".

As previously described in reference to FIG. 1, the sensor data 144 includes motion sensor data and a plurality of channels of proximity sensor data. The gesture-sensing system 310 performs a number of operations on the sensor data 144, ultimately generating gesture classification data 504 that may include classification of a gesture being performed by the user's hand into a gesture class, as described in the Example Gestures section above. The gesture classification data 504 may be received by the gesture-controlled device 300 and mapped to control data, such as a control function that results in the operating system of the gesture-controlled device 300 performing a specific software command or function. Thus, the gesture-sensing system 310 may operate as a translator between the sensor data 144 generated by the wearable device 100, encoding sensor data that indicates a multi-finger mid-air gesture being performed by the user's hand, and a software command of the gesture-controlled device 300, thereby enabling the user to control the gesture-controlled device 300 by performing multi-finger mid-air gestures while wearing the wearable device 100.

In some embodiments, the gesture-sensing system 310 may be implemented as software running on one or more processor devices. In other embodiments, one or more of the functions of the gesture-sensing system 310 may be implemented as logic in hardware, e.g., in an application-specific integrated circuit (ASIC) or other dedicated hardware module.

In various embodiments, the gesture-sensing system 310 may include one or more subsystems. A data segmentation subsystem 506 may be configured to continuously receive the sensor data 144 from the wearable device 100 as a time series for each of a plurality of sensor channels, for example six motion sensor data channels (three for x-y-z accelerometer data and three for roll-pitch-yaw gyroscope data) and a plurality of proximity sensor data channels (one for each proximity sensor 104). The time series of each sensor channel may then be segmented into a plurality of sensor data frames based on a predefined time window. For example, the time window may span 1000 sensor channel samples, resulting in a series of frames for each channel consisting of 1000 sensor data samples. In some embodiments, each channel may have a different sample rate, such that a fixed time window for each frame results in a different number of samples per frame for different channels. Thus, the data segmentation subsystem 506 may generate, for each motion sensor data channel, a plurality of motion sensor data frames, and for each proximity sensor data channel, a plurality of proximity sensor data frames.

In various embodiments, the frames may be overlapping or non-overlapping.

A data preprocessing subsystem 508 may be used in some embodiments to preprocess the sensor data (e.g., the segmented sensor data generated by the data segmentation subsystem 506). The data preprocessing subsystem 508 may preprocess the sensor data separately for each channel.

For each motion sensor data frame, the data preprocessing subsystem 508 may compute motion sensor power spectrum data by performing a Fourier transform on the motion sensor data frame. Thus, for example, for each incoming data frame t of the motion sensor data, a fast Fourier transform (FFT) may be performed on the motion sensor data samples of the data frame. A power spectrum is thereby generated for each motion sensor data channel: for example, $X_t$, $Y_t$, and $Z_t$ for the x, y, z axes of the accelerometer, and $R_t$, $P_t$, $W_t$ for the roll, pitch, yaw axes of the gyroscope.

For each proximity sensor data channel, the series of data values for the array of proximity sensors in frame t may be denoted $P1_t$, $P2_t$, . . . , $PN_t$, wherein N is the number of proximity sensors in the array.

In some embodiments, a further data preprocessing step may be performed in which accelerometer data frame values $X_t$, $Y_t$, and $Z_t$ are combined into a single accelerometer frame value $A_t$ by taking the max value across the time window, i.e., $A_{t,i}=\max(X_{t,i}, Y_{t,i}, Z_{t,i})$. Similar calculations may be performed for the gyroscope data frame values $R_t$, $P_t$, and $W_t$ to generate a single gyroscope frame value $G_t$ wherein $G_{t,i}=\max(R_{t,i}, P_{t,i}, W_{t,i})$.

In some embodiments, a further data preprocessing step may be performed in which a predetermined number (e.g., predetermined number w=20) of past frames are averaged. The data preprocessing subsystem 508 may preprocess the plurality of proximity motion data frames by generating a plurality of average motion sensor data values based on the plurality of motion sensor power spectra, and may preprocess the plurality of proximity sensor data frames by generating, for each proximity sensor channel, a plurality of average proximity sensor data values based on the plurality of proximity sensor data frames of the proximity sensor channel. Thus, for example, power spectra for accelerometer and/or gyroscope data are averaged, resulting averaged accelerometer value Acc wherein $Acc_i=\mathrm{mean}(A_{t,i}, A_{t-1,i}, \ldots, A_{t-w+1,i})$, and a similar averaged gyroscope value $Gcc_i=\mathrm{mean}(G_{t,i}, G_{t-1,i}, \ldots, G_{t-w+1,i})$. Similarly, the past data magnitudes are averaged for the proximity sensor frames P1, P2, . . . , PN, across each sequence of w past frames, resulting in averaged proximity sensor values Prox1 to ProxN.

In embodiments using one or more of the preprocessing steps described above, the preprocessed sensor data (e.g., averaged motions sensor data and averaged proximity sensor data) may be used by the subsequent feature extraction subsystem 510 to perform feature extraction. Thus, the feature data generated by the feature extraction subsystem 510 (as described below) is generated based on the plurality of average motion sensor data values, and the plurality of average proximity sensor data values of each proximity sensor channel.

In some embodiments, a feature extraction subsystem 510 is used to generate feature data based on the sensor data, such as the preprocessed sensor data generated by the data preprocessing subsystem 508. A feature extraction algorithm may be applied to the sensor data to select useful features. In some embodiments, the feature data comprises one or more statistical features of the plurality of average motion sensor data values, and, for each proximity sensor channel, one or more statistical features of the plurality of average proximity sensor data values. Each statistical feature may be selected from the list consisting of: a mean, a minimum, a maximum, a median, a standard deviation, a range, and a number of peaks. A summary may also be generated from one or more of the plurality of average motion sensor data values and/or average proximity sensor data values. In some embodiments, each of the statistical features above is generated, i.e. a mean, a minimum, a maximum, a median, a standard deviation, a range, and a number of peaks for each channel.

In some embodiments, a feature fusing subsystem 512 is used to fuse the feature data to generate a feature vector. For example, the statistical feature data generated by the feature extraction subsystem 510 is fused to generate a new high-dimensional feature vector, e.g., a one-dimensional feature vector having a large number of elements. Fusing the features may include, in some embodiments, aggregating all statistical features of all channels (i.e., statistical features of accelerometer Acc, gyroscope Gcc, and each proximity sensor Prox1 to ProxN) into a one-dimensional vector D and use the vector D as the input to a classifier 514.

The classifier 514 may be any type of algorithm or model configured or trained to classify multi-finger mid-air gestures based on features extracted from sensor data from the wearable device 100. The classifier 514 is configured to generate gesture classification data 504 based on the feature vector D.

In some embodiments, the classifier 514 is a trained support-vector machine (SVM). Training the SVM may require collecting and labelling training data from the wearable device 100 while it is mounted on the primary finger of a user, such as the current user or another user. The same primary finger (e.g., right index finger) is typically used for both training and gesture recognition in order to maximize the effectiveness of the training.

The gesture classification subsystem 522 may use any suitable classification technique to classify the multi-finger mid-air gesture as a particular gesture class. For example, in some embodiments the classifier 514 may use a trained neural network (e.g., a CNN) that has been trained to classify a multi-finger mid-air gesture according to a pre-defined set of gesture classes. Different training techniques may be used in different embodiments, such as supervised learning or unsupervised learning, reinforcement learning, deep learning, etc.

The sensor data may be used to generate features that allow the classifier 514 to recognize a broad range of multi-finger mid-air gestures. Assuming the index finger as the primary finger, the 3-axis accelerometer 122 may be used for detecting the finger actions of the index finger and the bio-acoustic signals from thumb and index fingers. The 3-axis gyroscope 124 may be used for calculating the orientation of the wearable device 100 (i.e., yaw, roll, and pitch angles), which can be an additional input modality, such as controlling a mouse cursor by tilting the mouse. The relative positions of the primary finger and the other fingers (such as neighboring fingers) may be determined based at least in part on the proximity sensor data. The bio-acoustic data detected by the accelerometer 122 may be used, e.g., to detect finger collision events by using a high-frequency accelerometer sampling rate, such as greater than 100 Hz or greater than 3000 Hz (as described above in the Example Wearable Devices section). The motion sensor data may also be used to detect absolute motion of the primary finger, which may in turn be used to detect absolute motion of the hand and/or arm.

The gesture classification data 504 contains information regarding the classification of a gesture being performed by the user's hand, based on the received sensor data, into one or more gesture classes (e.g. a static gesture class and/or dynamic gesture class). In some embodiments, the gesture classification data 504 includes a label associating the current sensor data with a gesture class. In other embodiments, the gesture classification data 504 includes probability data (e.g., logits) indicating likelihood of the sensor data being associated with each of a plurality of gesture classes. Based on the probability data, a gesture class having the highest likelihood may be selected as the most likely gesture being performed at a subsequent processing operation.

In some embodiments, additional operations may be performed prior to, after, or as part of the classifier 514 in order to leverage historical gesture data to recognize dynamic gestures being performed over time. Thus, for example, a gesture queue may be used to store historical gesture data indicating a sequence of past static gestures performed, the times in which they were performed, and the location in which they were performed at each time. This historical gesture data may be used by the classifier 514 or by a separate dynamic gesture classification subsystem (not shown), along with the current feature vector or classifier output indicating a current static gesture, to classify a dynamic gesture being performed by the user over time.

Example Methods for Controlling a Gesture-Controlled Device

Figure 6:
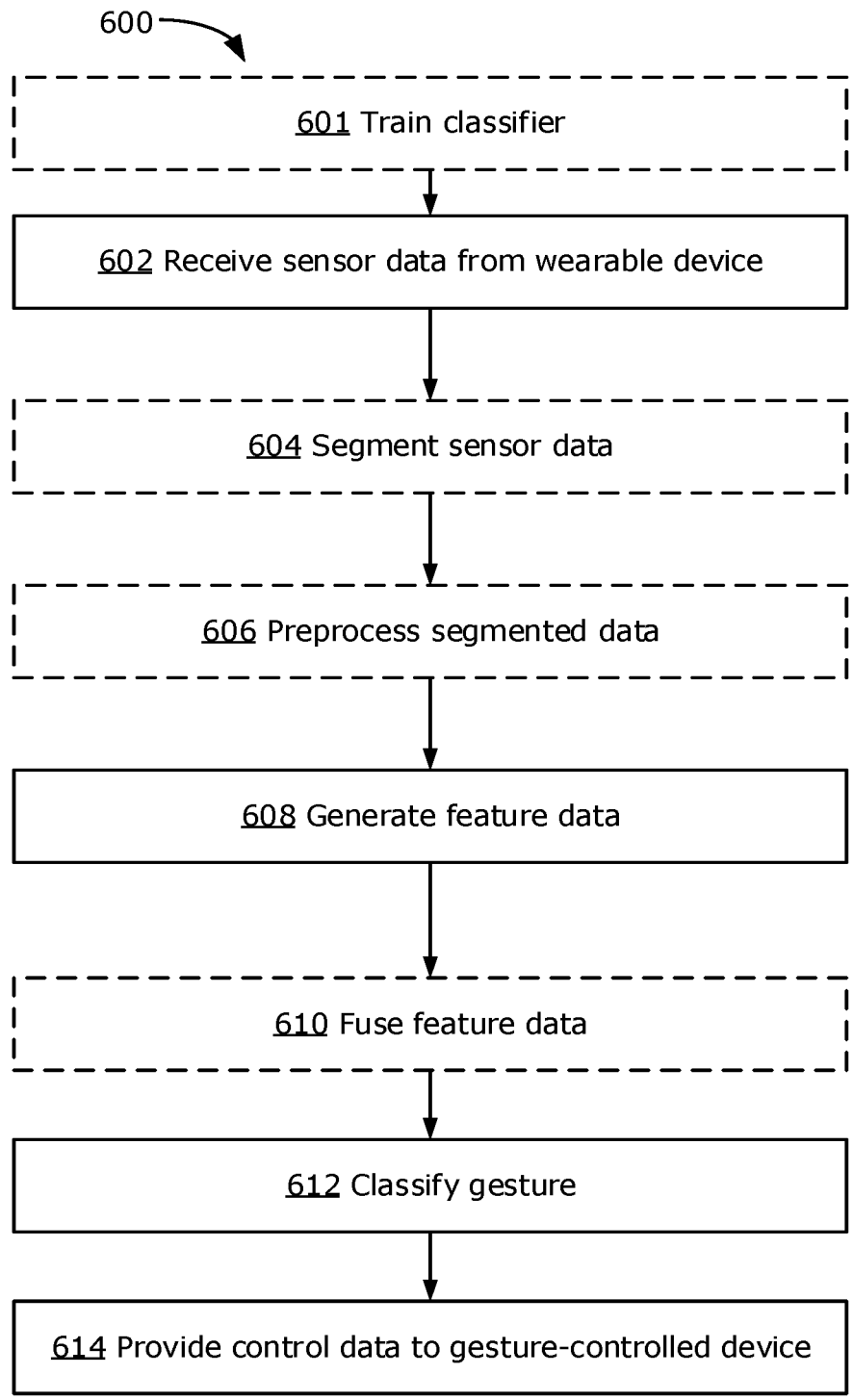
FIG. 6 is a flowchart illustrating steps of an example method for controlling a gesture-controlled device based on a mid-air gestures, according to examples described herein.

FIG. 6 is a flowchart showing steps of an example method 600 for controlling a gesture-controlled device based on a mid-air gesture being performed by a user's hand. The method 600 may be performed by the gesture-sensing system 310 in some embodiments, and will be described in the example below with reference to the subsystems of the example gesture-sensing system 310, to the example gesture-controlled device 300, and to the example wearable device 100. Optional steps are shown in dashed lines in FIG. 6.

At 601, optionally, a classifier (such as classifier 514) is trained to classify multi-finger mid-air gestures based on sensor data from a wearable device (such as wearable device 100, for example smart ring 200) worn on a primary finger of the user's hand. Different embodiments may use different classifiers and different training techniques, as described above. In some embodiments, training the classifier may include training a support-vector machine using supervised learning to generate a trained support-vector machine.

At 602, sensor data 144 is received from the wearable device 100 worn on a primary finger of the user's hand (e.g., the index finger of the right hand). The sensor data may include motion sensor data and a plurality of proximity sensor data channels. The motion sensor data encodes motion sensor data from a motion sensor of the wearable device, such as the amplified motion sensor signal 140. The plurality of proximity sensor data channels each encode proximity sensor data from a proximity sensor of the wearable device, such as multi-channel data derived from the amplified multiplexed proximity sensor signal 142.

In some embodiments, the motion sensor data comprises three channels of accelerometer data. Each channel of accelerometer data indicates acceleration of the wearable device with respect to a respective spatial axis (such as x, y, and z). In some embodiments, the motion sensor data further comprises three channels of gyroscope data. Each channel of accelerometer data indicates an angular velocity of the wearable device with respect to a respective spatial axis (such as x, y, and z).

The accelerometer data channels may encode accelerometer data sampled at high frequencies to capture bio-acoustic signals in the user's body. In some embodiments, the motion sensor data comprises accelerometer data sampled at a frequency greater than 100 Hz, in order to capture bio-acoustic vibrations from finger collision events of the user's hand. In other embodiments, the motion sensor data comprises accelerometer data sampled at a frequency greater than 3000 Hz to capture higher-frequency movements such as rubbing movements.

As described above, some embodiments may use the controller 112 of the wearable device 100 to perform some steps of the method 600. As such, this step 602 may include receiving (at the controller 112) the sensor data 144 (from the same controller 112). The sensor data 144 may thus nonetheless be considered to be received from the wearable device 100.

At 604, optionally, the sensor data 144 is segmented to generate a plurality of motion sensor data frames and, for each proximity sensor channel, a plurality of proximity sensor data frames (e.g., as described above with reference to the data segmentation subsystem 506 of the gesture-sensing system 310).

At 606, optionally, the segmented data is preprocessed (e.g., by the data preprocessing subsystem 508). The plurality of motion sensor data frames may be preprocessed by, for each motion sensor data frame, computing motion sensor power spectrum data by performing a Fourier transform on the motion sensor data frame. In some embodiments, a plurality of average motion sensor data values (such as Acc and Gcc) may also be generated based on the plurality of motion sensor power spectra. The plurality of proximity sensor data frames may be preprocessed by generating, for each proximity sensor channel (such as P1), a plurality of average proximity sensor data values (such as Prox1) based on the plurality of proximity sensor data frames of the proximity sensor channel.

At 608, feature data is generated based on the sensor data 144 (e.g., based on the plurality of average motion sensor data values and plurality of average proximity sensor data values of each proximity sensor channel, as extracted by the feature extraction subsystem 510). The feature data indicates one or more features of the sensor data, and may comprise one or more statistical features of the sensor data (e.g., one or more statistical features of the plurality of average motion sensor data values, and, for each proximity sensor channel, one or more statistical features of the plurality of average proximity sensor data values). Each statistical feature may be selected from the list consisting of a mean, a minimum, a maximum, a median, a standard deviation, a range, and a number of peaks, as described above with reference to the feature extraction subsystem 510 of FIG. 5.

At 610, optionally, the feature data is fused to generate a feature vector (e.g., by the feature fusing subsystem 512). The feature vector may be a high-dimensional feature vector D aggregating all the features of Acc, Gcc, and Prox1 through ProxN.

At 612, the multi-finger mid-air gesture performed by the user's hand is classified (e.g., using classifier 514) to generate gesture classification data 504 based on the feature data (e.g., feature vector D). In some embodiments, the classifier 514 is a trained support-vector machine (SVM). In some embodiments, the gesture classification data 504 includes probability data for each of a plurality of gesture classes. The plurality of gesture classes may include at least one gesture class defined at least in part by relative positions of a thumb, index finger, and middle finger of a hand, such as the static and dynamic gesture classes described in the Example Gestures section above. In some embodiments, the gesture classification data 504 identifies the gesture as belonging to a particular gesture class.

At 614, control data is provided to the gesture-controlled device (e.g. gesture-controlled device 300) based on the gesture classification data 504. The control data may include one or more commands to be executed by the gesture-controlled device 300.

Thus, after a multi-finger mid-air gesture has been recognized by classifying it into a gesture class, a software application (e.g., an operating system) of the gesture-controlled device 300 may translate the gesture classification data 504 (e.g., including identification of a gesture class) outputted by the gesture-sensing system 310 into control data including a command (e.g., a command to execute a function). The translation of the gesture class into the command may be application-dependent, context-dependent, or state-dependent. For example, a given gesture class may be translated into a first command when a first application is active or in a first context or state of the device, but may be translated into a second command (or may be considered invalid) when a second application is active or in a second context or state of the device. Thus, in some embodiments, the classifier 514 may be used to recognize a mid-air gesture being performed by the user's hand and select a function for execution by the gesture-controlled device 300 based at least in part on the recognized mid-air gesture.

In some embodiments, one of the commands performed by the gesture-controlled device 300 in response to receiving the gesture classification data 504 includes providing feedback to the user indicating the recognized gesture. Thus, for example, the gesture-controlled device 300 may output visual feedback to an output device 314 such as a display indicating a function being performed based on the recognized gesture. It will be appreciated that a number of techniques may be used to provide visual or other types of feedback for mid-air gesture control systems.

In some embodiments, the gyroscope 124 may be used to determine the orientation of the wearable device 100 (i.e., yaw, roll, and pitch angles), which can be used in some examples as an additional input modality, such as controlling a mouse cursor by tilting the wearable device 100.

An example user-facing software application controlled using multi-finger mid-air gestures detected by the smart ring 200 will now be described to illustrate the inter-relation of the various example devices, systems, and methods described herein. The software application is a smart television (TV) control interface.

In an example scenario, a user is trying to activate a smart TV and adjust its volume. The smart TV begins in a dormant or sleep state, and the user's hand is wearing the smart ring 200 on the index finger.

First, the user performs a "gunshot" dynamic gesture (described in the Example Gestures section above) to turn on the TV. The smart ring 200 captures the various movements and positions of the hand and fingers in the course of performing the "gunshot" dynamic gesture and transmits them to the smart TV using the communication link 114. In this example, the smart TV is both the gesture-controlled device 300 and the device used to implement the gesture-sensing system 310.

The gesture-sensing system 310, running as instructions executed by the processor 302 of the smart TV, performs the steps of method 600, generating control data that commands the smart TV to switch on from its dormant state to an awake, activated state. A display of the smart TV indicates that the device is now active.

The user then performs a two-finger pinch dynamic gesture twice (separated by a "pinch open" gesture in which the index finger moves away from the thumb). This sequence of gestures is mapped to control data commanding the smart TV to display the cursor and other GUI widgets used for gesture-based control feedback on the display of the smart TV.

To control the cursor, the user first performs a pointing dynamic gesture and then tilts the smart ring 200 to move the cursor as if the user is controlling an ordinary air mouse (e.g., using the gyroscope 124 to detect angular velocity and translate this gyroscope data into control data commanding the gesture-controlled device 300 to move the cursor on the display). Note that the user cannot control the cursor with other gestures in this example, which may mitigate against the "Midas Touch" problem in which a user interface translates inadvertent user action (or inaction) as a command.

The user tilts the smart ring 200 to move the cursor onto a volume widget displayed on the display, and then performs a mouse-click dynamic gesture to select the widget.

The user performs zoom-in and zoom-out dynamic gestures to control the audio volume. The user can maintain the zoom-in dynamic gesture for a certain amount of time to make the volume decrease accordingly. Likewise, the user can gradually increase the volume by spreading out the index finger, middle finger, and thumb for a certain amount of time.

Finally, the user may perform a first dynamic gesture to mute the smart TV.

It will be appreciated that any combination of static and/or dynamic gestures may be mapped to any combination of commands or functions of the gesture-controlled device 300 in a given context, as described above.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for controlling a gesture-controlled device based on a mid-air gesture being performed by a user's hand, comprising:
    obtaining sensor data from a wearable device worn on a primary finger of the user's hand, the sensor data comprising:
        a plurality of proximity sensor data channels, each encoding proximity sensor data from a proximity sensor of the wearable device; and
        motion sensor data from a motion sensor of the wearable device;
    segmenting the sensor data to generate:
        a plurality of motion sensor data frames; and
        for each proximity sensor channel, a plurality of proximity sensor data frames;
    preprocessing the plurality of motion sensor data frames by:
        for each motion sensor data frame, computing motion sensor power spectrum data by performing a Fourier transform on the motion sensor data frame;
        generating a plurality of average motion sensor data values based on the plurality of motion sensor power spectra; and
        preprocessing the plurality of proximity sensor data frames by generating, for each proximity sensor channel, a plurality of average proximity sensor data values based on the plurality of proximity sensor data frames of the proximity sensor channel;
    generating feature data based on:
        the plurality of average motion sensor data values; and
        the plurality of average proximity sensor data values of each proximity sensor channel,
        the feature data indicating one or more features of the sensor data;
    classifying the mid-air gesture to generate gesture classification data based on the feature data; and
    providing control data to the gesture-controlled device based on the gesture classification data.

2. The method of claim 1, wherein the feature data comprises:
    one or more statistical features of the plurality of average motion sensor data values; and
    for each proximity sensor channel, one or more statistical features of the plurality of average proximity sensor data values,
    each statistical feature being selected from the list consisting of:
        a mean, a minimum, a maximum, a median, a standard deviation, a range, and a number of peaks.

3. The method of claim 2, wherein classifying the gesture comprises:
    fusing the feature data to generate a feature vector; and
    using a classifier to generate the gesture classification data based on the feature vector.

4. The method of claim 3, wherein the classifier comprises a trained support-vector machine (SVM).

5. The method of claim 4, further comprising, prior to receiving the sensor data, training a support-vector machine using supervised learning to generate the trained support-vector machine.

6. The method of claim 1, wherein the motion sensor data comprises:
    three channels of accelerometer data, each channel indicating acceleration of the wearable device with respect to a respective spatial axis; and
    three channels of gyroscope data, each channel indicating an angular velocity of the wearable device with respect to a respective spatial axis.

7. The method of claim 1, wherein:
    the gesture classification data comprises probability data for each of a plurality of gesture classes; and
    the plurality of gesture classes includes at least one gesture class defined at least in part by relative positions of a thumb, index finger, and middle finger of a hand.

8. A wearable device configured to be worn on a primary finger of a hand, comprising:
    a motion sensor configured to generate a motion sensor signal indicating a motion of the wearable device;
    a plurality of proximity sensors, each proximity sensor being arranged at one of a plurality of circumferential locations of the wearable device defined by a circumference of the primary finger,
        each proximity sensor facing in a proximity sensor direction outward from the primary finger; and
        each proximity sensor being configured to generate a proximity sensor signal indicating a proximity of an object to the proximity sensor in the proximity sensor direction;
    a communication link configured to transmit:
        motion sensor data based on the motion sensor signal; and
        a plurality of channels of proximity sensor data, each channel being based on a respective proximity sensor signal;
    a multiplexer configured to generate a multiplexed proximity sensor signal based on the plurality of proximity sensor signals;
    at least one signal amplifier configured to:
        generate an amplified motion sensor signal based on the motion sensor signal; and
        generate an amplified multiplexed proximity sensor signal based on the multiplexed proximity sensor signal; and
    a controller configured to generate:
        the motion sensor data based on the amplified motion sensor signal; and
        the plurality of channels of proximity sensor data based on the amplified multiplexed proximity sensor signal.

9. The wearable device of claim 8, comprising a ring configured to be worn on the primary finger, the primary finger being an index finger.

10. The wearable device of claim 9, wherein the plurality of circumferential locations comprise:
    at least one location on a middle finger-facing portion of the ring; and
    at least one location on a thumb-facing portion of the ring.

11. The wearable device of claim 8, wherein each proximity sensor comprises a sensor selected from the list consisting of:
    an infrared light sensor, an ultrasonic sensor, and a radar sensor.

12. The wearable device of claim 8, wherein:

the motion sensor comprises an accelerometer; and the motion sensor signal comprises three channels of accelerometer data, each channel indicating acceleration of the wearable device with respect to a respective spatial axis.

13. The wearable device of claim 12, wherein:

the motion sensor further comprises a gyroscope; and the motion sensor data further comprises three channels of gyroscope data, each channel indicating an angular velocity of the wearable device with respect to a respective spatial axis.

14. The wearable device of claim 8, wherein:

the motion sensor comprises an accelerometer; and the motion sensor data comprises accelerometer data sampled at a frequency greater than 100 Hz.

15. The wearable device of claim 8, further comprising:

a controller configured to:

generate feature data based on the motion sensor signals and proximity sensor signals, the feature data indicating one or more features of the motion sensor signal and proximity sensor signals; and classify a mid-air gesture being performed by the hand to generate gesture classification data based on the feature data; and a communication link configured to transmit the gesture classification data.

16. A non-transitory processor-readable medium having machine-executable instructions stored thereon which, when executed by a processor device, cause the processor device to control a gesture-controlled device based on a mid-air gesture being performed by a user's hand by:

obtaining sensor data from a wearable device worn on a primary finger of the user's hand, the sensor data comprising:

a plurality of proximity sensor data channels, each encoding proximity sensor data from a proximity sensor of the wearable device; and motion sensor data from a motion sensor of the wearable device;

segmenting the sensor data to generate:

a plurality of motion sensor data frames; and for each proximity sensor channel, a plurality of proximity sensor data frames;

preprocessing the plurality of motion sensor data frames by:

for each motion sensor data frame, computing motion sensor power spectrum data by performing a Fourier transform on the motion sensor data frame;

generating a plurality of average motion sensor data values based on the plurality of motion sensor power spectra; and preprocessing the plurality of proximity sensor data frames by generating, for each proximity sensor channel, a plurality of average proximity sensor data values based on the plurality of proximity sensor data frames of the proximity sensor channel;

generating feature data based on:

the plurality of average motion sensor data values; and the plurality of average proximity sensor data values of each proximity sensor channel, the feature data indicating one or more features of the sensor data;

classifying the mid-air gesture to generate gesture classification data based on the feature data; and providing control data to the gesture-controlled device based on the gesture classification data.

17. The medium of claim 16, wherein the feature data comprises:

one or more statistical features of the plurality of average motion sensor data values; and for each proximity sensor channel, one or more statistical features of the plurality of average proximity sensor data values, each statistical feature being selected from the list consisting of:

a mean, a minimum, a maximum, a median, a standard deviation, a range, and a number of peaks.

18. The medium of claim 17, wherein classifying the gesture comprises:

fusing the feature data to generate a feature vector; and using a classifier to generate the gesture classification data based on the feature vector.

19. The medium of claim 18, wherein the classifier comprises a trained support-vector machine (SVM).

20. The medium of claim 19, wherein the instructions, when executed by the processor device, further cause the processor device to:

prior to receiving the sensor data, train a support-vector machine using supervised learning to generate the trained support-vector machine.

\* \* \* \* \*

UNITED STATES PATENT AND TRADEMARK OFFICE
CERTIFICATE OF CORRECTION

| | |
|---|---|
| PATENT NO. | : 11,573,642 B2 |
| APPLICATION NO. | : 17/138677 |
| DATED | : February 7, 2023 |
| INVENTOR(S) | : Huang Da-Yuan and Wei Li |

Page 1 of 1

It is certified that error appears in the above-identified patent and that said Letters Patent is hereby corrected as shown below:

In the Claims

In Column 23, Line 7 (Claim 13): "The wearable device of claim 12" should read --The wearable device of claim 8--.

Signed and Sealed this
Eleventh Day of February, 2025

Coke Morgan Stewart
*Acting Director of the United States Patent and Trademark Office*